R. Pratt,
Horse Rake.
No. 2156
Reissued Jan. 23. 1866.
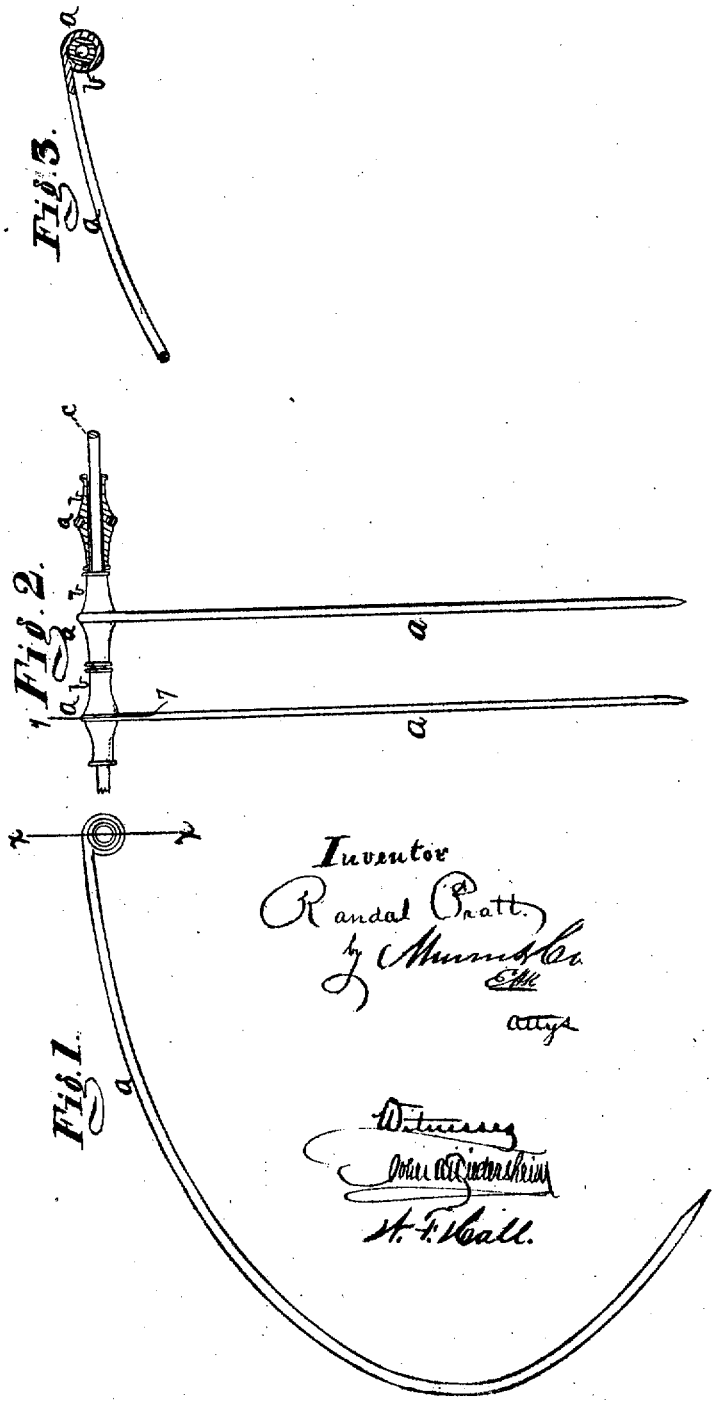
Inventor
Randal Pratt.
by Munn & Co.
Attys
Witnesses
John A. Wiedersheim
H. F. Hall.

UNITED STATES PATENT OFFICE.

RANDAL PRATT, OF MARPLE TOWNSHIP, DELAWARE COUNTY, PA.

IMPROVEMENT IN HORSE-RAKES.

Specification forming part of Letters Patent No. 14,067, dated January 8, 1856; Reissue No. 2,156, dated January 23, 1866.

*To all whom it may concern:*

Be it known that I, RANDAL PRATT, of the township of Marple, in the county of Delaware and State of Pennsylvania, have invented a new and useful Improvement in Horse Hay-Rakes; and I do hereby declare the following to be a full, clear, and exact description of the nature, construction, and operation of that part of my said invention designated in Division No. 4, sufficient to enable one skilled in the art to which it is allied to construct and use the same, reference being had to the accompanying drawings, which are made part of this specification, and in which—

Figure 1 is a side elevation of the tooth attached to its collar. Fig. 2 is a rear elevation of the same, one of the collars being shown in section on the line *x x*, Fig. 1. Fig. 3 is an elevation and partial section of the tooth and collar on the line *y y*, Fig. 2.

Similar letters of reference indicate corresponding parts in the different figures.

The nature of my invention under this patent consists in the mode of fastening the rake-tooth to the elongated tubular collar by bending and shrinking the tooth into a groove in the said collar, so as to firmly connect them.

In the drawings, *a* is the tooth, which is preferably of a semi-elliptical or parabolic shape. *b* are collars, which slide loosely on the shaft or rod *c*, so as, while held longitudinally in place, to have freedom and independence of motion in a plane at right angles to the axis of the rod *c*. Each collar has around its central portion a groove or depression, in which the hinging end of a rake-tooth is bent while hot, so as in cooling to shrink closely into the said groove and become firmly attached to the collar, giving rigidity of connection and making the lateral stiffness of the collar available to the teeth. The rod *c*, which runs parallel to the axle of the carriage on which the rake is mounted, has upon it collars *b*, equal in number to the teeth, and the distance apart of the teeth is regulated by the length of the collars, there being one to each tooth and their number depending upon the width of the swath it is desired to rake. The length of the collars being much greater than that of the teeth, the lateral stiffness of the latter is much increased, and any pressure sidewise upon the teeth does not to the same extent deflect them from their true line, as it would were they loosely attached to the collar or merely coiled around the rod or shaft *c*. It is an important practical point to give a rigid connection to the rake-tooth and collar, the latter forming an extended base for the lateral support of the tooth, while the collar is enabled to rotate upon the shaft *c* as the tooth is raised, either independently of the others by an obstruction or in company with them as the load is discharged, the axis of that portion of the tooth which is bent around the collar being the axis of motion of the tooth. The groove in each collar runs entirely around the central portion, and the upper forward end of the tooth, after being heated and bent, is shrunk snugly into the said groove, so as to firmly embrace the collar. The series of collars are maintained upon the rod by nuts and screws at each end, or in any other suitable manner.

The collars may or may not be grooved; but I prefer to use the grooved collar, as it furnishes a socket or seat for the more effective and secure attachment of the tooth to the collar, fortifying it against dislodgment from the collar under the twisting strain to which it is occasionally subjected.

Having described my invention, what I claim herein as new, and desire to secure by Letters Patent, is—

1. The method described of firmly uniting the tooth with the elongated collar by bending and shrinking the hinging end of the tooth around the collar, substantially as described.

2. Providing the elongated collar with a groove, into which the tooth is shrunk, as and for the purpose described.

RANDAL PRATT.

Witnesses:

GEO. H. RIGBY,

EZRA SMEDLEY.